United States Patent
Duke et al.

(10) Patent No.: US 6,222,987 B1
(45) Date of Patent: *Apr. 24, 2001

(54) PIZZA BOX HEATER, COMPONENTS THEREFOR AND METHOD

(75) Inventors: William Lee Duke, Gum Spring; Hugh A. Conway, Jr., Richmond, both of VA (US)

(73) Assignee: Auzville Jackson, Jr., Richmond, VA (US); a part interest (*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,279

(22) Filed: May 6, 1999

(51) Int. Cl.[7] .................................................. F24H 3/00
(52) U.S. Cl. .......................... 392/383; 392/365; 219/387; 439/668; 439/485
(58) Field of Search .................. 392/383, 384, 392/382, 365–369; 439/485, 487, 668, 669; 219/386, 387, 400

(56) References Cited

U.S. PATENT DOCUMENTS

| | | | |
|---|---|---|---|
| D. 315,789 | * | 3/1991 | Muderlak .............................. D23/366 |
| 3,229,070 | * | 1/1966 | Wells ...................................... 392/365 |
| 3,331,940 | * | 7/1967 | Reid, Jr. ................................. 392/365 |
| 3,624,346 | * | 11/1971 | Guth ...................................... 392/384 |
| 3,702,918 | * | 11/1972 | Moller ................................... 392/369 |
| 3,725,640 | * | 4/1973 | Kunz ..................................... 392/368 |
| 3,924,099 | * | 12/1975 | Housel .................................. 392/368 |
| 4,141,320 | * | 2/1979 | Hatfield ................................. 219/400 |
| 4,366,368 | * | 12/1982 | Stephens, III ........................ 392/385 |
| 4,808,347 | * | 2/1989 | Dawn ...................................... 261/30 |
| 4,874,921 | * | 10/1989 | Gerbig, Jr. ............................ 219/202 |
| 4,918,290 | * | 4/1990 | DeMars ................................. 219/400 |
| 4,922,626 | * | 5/1990 | Fiddler ..................................... 34/90 |
| 4,968,456 | * | 11/1990 | Muderlak et al. .................... 422/122 |
| 5,416,886 | * | 5/1995 | Zahler ................................... 392/382 |
| 5,454,060 | * | 9/1995 | McDermott .......................... 392/383 |
| 5,463,203 | * | 10/1995 | Moore ................................... 392/368 |
| 5,787,228 | * | 7/1998 | Fiely et al. ............................ 392/383 |

FOREIGN PATENT DOCUMENTS 4-121367 * 4/1992 (JP) .

* cited by examiner

Primary Examiner—John A. Jeffery

(57) ABSTRACT

A pizza box delivery bag has disposed therein a flat container with a heater and fan within an insulating enclosure connected to an electrical outlet for the bag. The plug used for the connection has a cooling fan within the plug for blowing cooling air over the connection so as to provide greater amperage output for continuous useage.

3 Claims, 6 Drawing Sheets

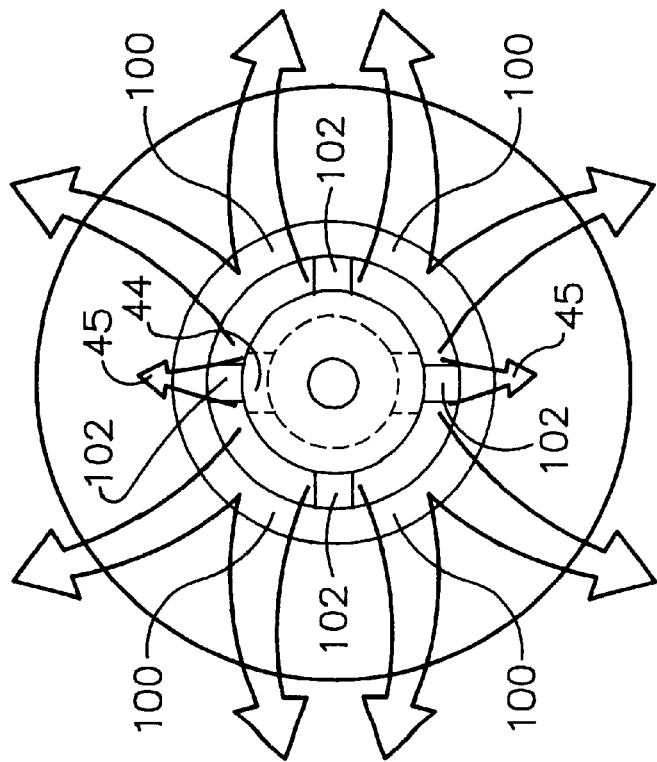
FIG. 5
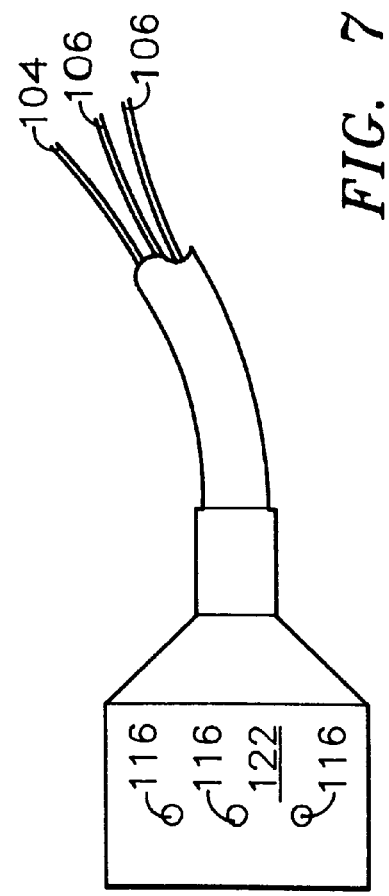
FIG. 7
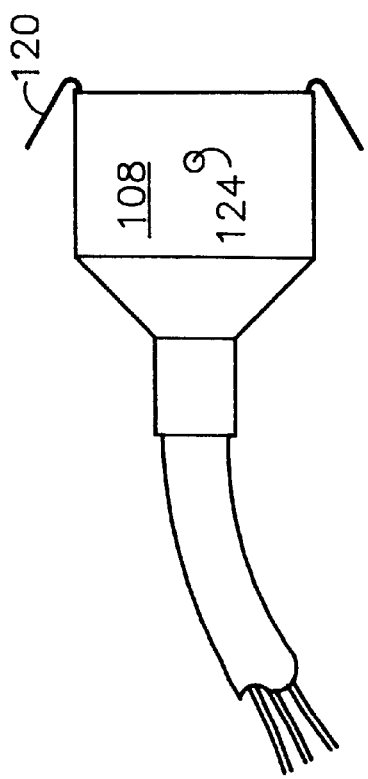

US 6,222,987 B1

PIZZA BOX HEATER, COMPONENTS THEREFOR AND METHOD

FIELD OF THE INVENTION

This invention relates to the heating of pizza boxes for home and office delivery, components for such a system and a method for using such a system including other similar applications.

Pizza is being currently delivered to offices and residences after cooking at a central location. Various schemes for maintaining the heat of the pizza have been used and proposed in the past so that the pizza will arrive to the user in a still-heated condition. However, usually these previous proposals have fallen short of maintaining an ideal temperature for the pizza which is approximately 170 degrees Fahrenheit. Also, there has long been a need for a 12-volt or other battery outlet such as used in the common 12-volt direct current electrical system for a vehicle. Such an electrical outlet, which is primarily for cigarette lighters, may also be utilizable for many other applications. Unfortunately, many of these applications require a greater current draw than is available from a standard vehicle electrical outlet. If such a higher output current was available, numerous other applications could become available and old applications could become more efficient. The present electrical outlet is usually only rated for continuous usage at approximately 7.5 amps but if it is used continuously the amps drawn by higher currents would not work satisfactorily.

SUMMARY OF THE INVENTION

The present invention utilizes an electric heater mounted in an insulated package which can also carry a pre-cooked pizza in a box. The heater is connected to an electrical plug which is air-cooled to permit the plug to be used with a high amperage rating and in a pre-existing electrical outlet such as a cigarette lighter. There is a cable which can be connected from the electrical plug to a mating cable or outlet from the electric heater. The heater is a flat heating member that permits raising the temperature to the desired range and it has an inlet fan that pulls in air from outside the heater container and forces it over the heating element and then out of the container. There is continuously circulating heated air within the package for heating the pizza. The electrical plug has a small fan that forces air around the inside of the plug and over the end components to keep them cool and permit the amperage rating to be maintained at a continuously high current output in the vicinity of 20 amps. Although the system was primarily designed for pizza box heaters, the electrical plug or similar plug can be utilized for powering other connected devices. A similar electrical plug and/or heater can be utilized for the delivery of heat or power to other devices and the methods for utilizing this system embraces the use of the various components either in combination or with other systems, such as portable jacks, thermoelectric refrigerators and so forth.

The numerous advantages of the invention will appear from the following description and appended claims, reference being made to the accompanying drawings forming a part of this specification wherein like reference characters designate corresponding parts in the several views.

BRIEF DESCRIPTION OF THE DRAWINGS

FIG. 5 is a schematic end view of the air flow from the electrical plug.

FIG. 7 is a schematic plan view of the electrical cable connection.

DETAILED DESCRIPTION OF THE PREFERRED EMBODIMENT

Figure 1:
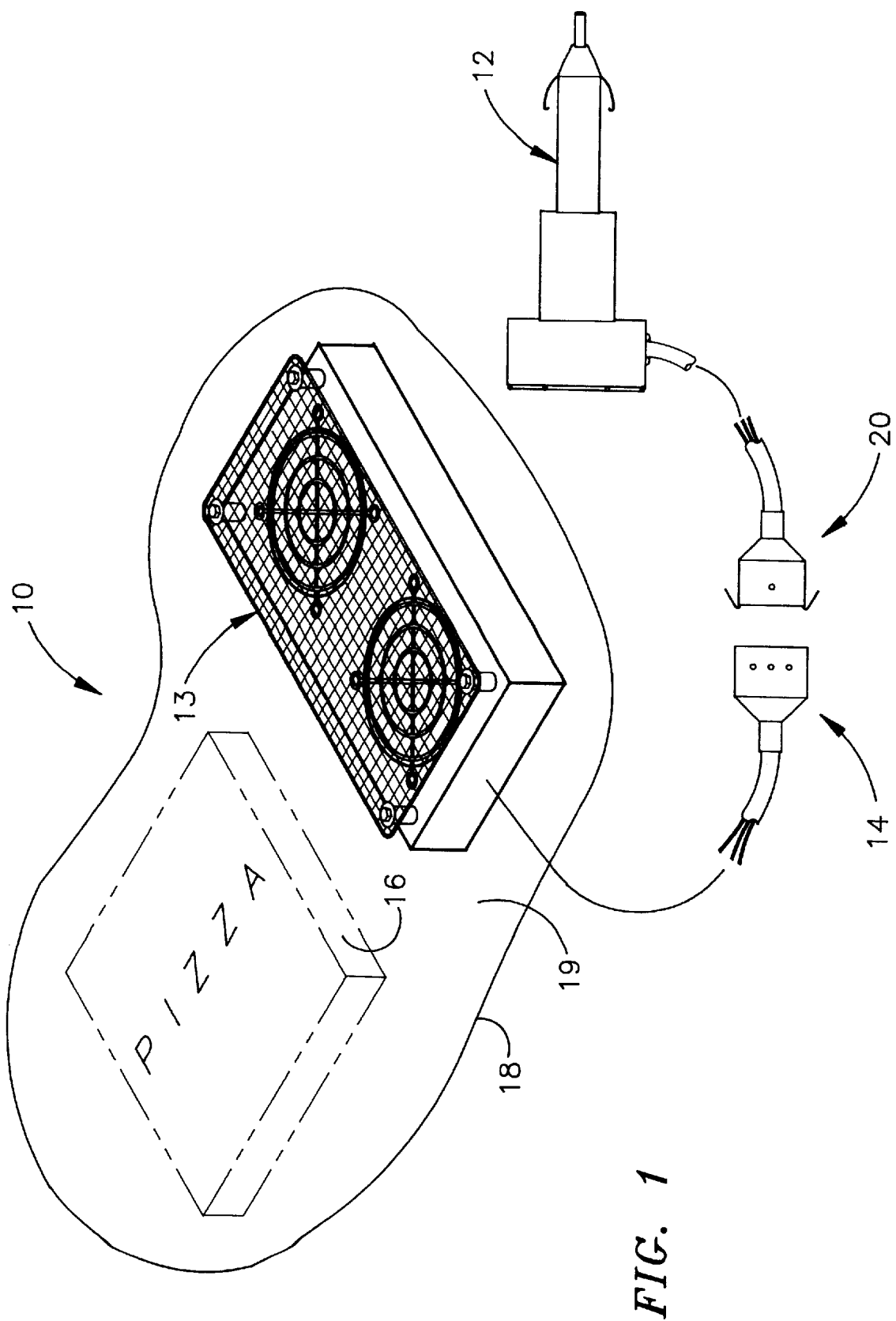
FIG. 1 is a schematic perspective of a pizza box, container, heater, cable and electrical plug.

With reference to FIG. 1 there is shown the combination 10 of an electrical plug 12 and heater 13 connected by a cable 14 between the electrical plug and heater. The male electrical plug includes a build-in fan cooling assembly which will be described more fully later. This is adapted to plug into a pre-existing vehicle electrical outlet. The heater 13 is associated with a pizza box 16 inside an insulated cover 18. The insulated cover can be an insulated flexible bag or insulated box. The electrical cable coming from the electrical plug is connected by a convenient connector 20 to the cable coming from the heater. The combination 10 permits the system to be used for mobile delivery through delivery systems and especially for meals delivered to residences and offices.

There is a legal safe temperature for meals established by the Department of Agriculture in Federal Regulations for Food Service Safety. Some of the meals presently delivered use insulated picnic ice chests with "hot bricks" placed inside to keep the food hot. Frequently the meals presently delivered do not meet the standards for holding food at around 190–220 degrees Fahrenheit. As stated earlier, pizza only needs approximately 170° F. The present invention permits such temperatures to be achieved. Also, in some instances, the cooking can continue during the delivery to expedite the time between the order and deliver. (It is found that the standard plug for an electrical outlet can only take 9–10 amps max. for 10–12 minutes. However, the present plug can produce 18.5 amps or more continuously)

Figure 2:
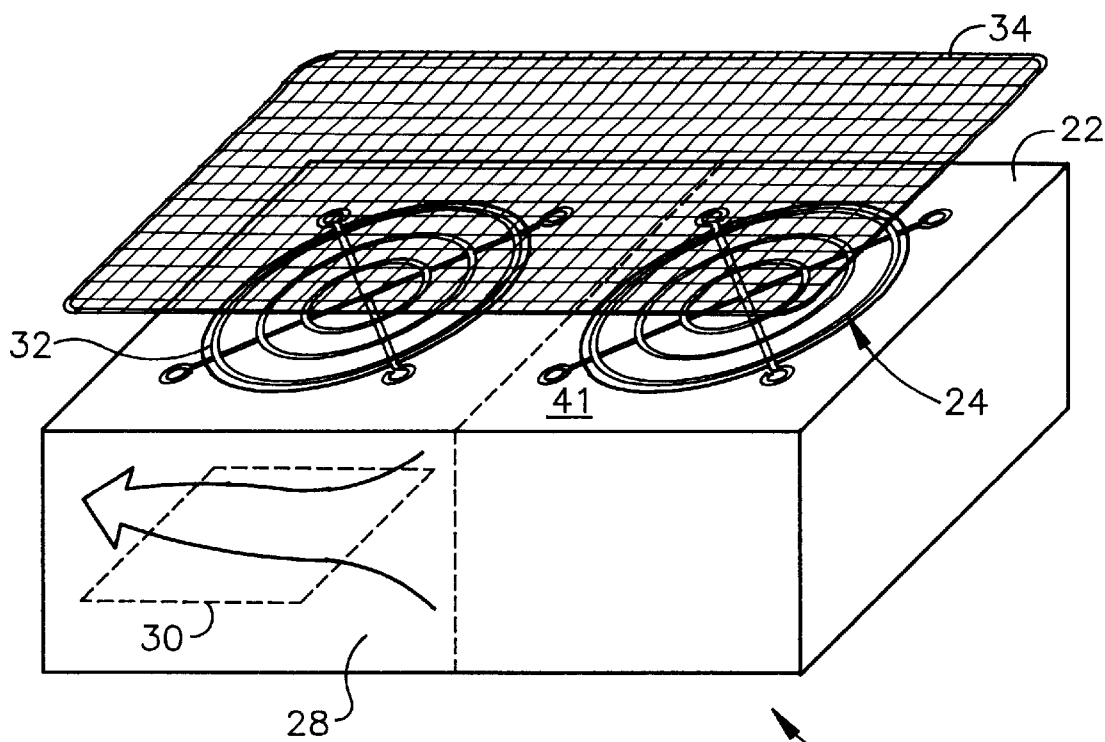
FIG. 2 is a schematic perspective of the heater.
Figure 3:
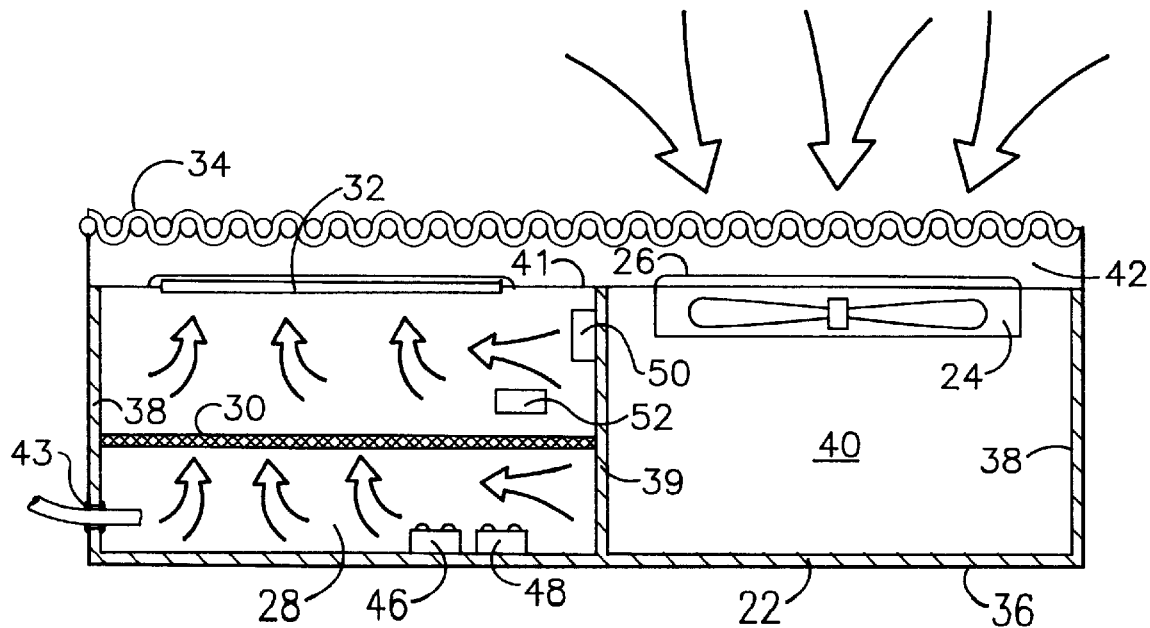
FIG. 3 is a schematic cross-section of the heater.

With reference to FIG. 2 and FIG. 3, there is shown a schematic perspective and a schematic cross section of the heater 13. The heater is preferably contained in a flat box or container 22 which is approximately 14 inches long, 7 inches wide and 2 inches high. The box 22 has a base which contains a centrifugal fan 24 mounted at one end of the box. The fan has an inlet 26 to pull in air by the fan which is then caused to blow over the heater compartment 28 which contains the heater mesh 30. This heater mesh is adapted for this purpose and is manufactured by the Ohm Weave Corp. as its Thermo-Weave heating element. Ohm Weave Corp. is located at 26 Industrial Road, Niantic, Conn. 06357. The element is 13.6 volts DC and products 220 watts. The flat centrifugal fan 24 is readily available for 12 volts DC and draws 0.18 amps at 2600 rpms. with a voltage operating range from 10.2 to 13.8 volts DC. The temperature range specifications is from −10 to +70 degrees centigrade and found to be reliable at 195 degrees Fahrenheit. The flowing air after passing over the heater mesh exits at exit opening 32 to heat the surrounding area. The inlet 26 and exit opening 32 are covered by a grill 34 that permits the ready circulation of the heated air around the product.

With reference to FIG. 3 there is shown a schematic cross-section of the heater. The box or case 22 has an insulated bottom 36 and insulated fan walls 38. The heater compartment 28 contains the heating element or heater mesh 30 and inlet or opening 39 between the fan compartment 40 and heating compartment. Both the inlet and hot air exit are at the top 41 of the box 22. The wire grid or grill 34 serves as a spacer and is shown over the top of the unit and serves to provide a space 42 through which the heated air can circulate without contacting the food box in the food compartment 19 that would normally be adjacent the heater. Both the food and pizza box 16 and the insulated cover 18 are not shown in this view. The figure also shows the cable 14 inlet hole and grommet 43. The cable 14 is connected to a positive terminal strip 46 and a negative terminal strip or ground terminal strip 48. A bi-metallic control or limit switch 50 is set for a minimum temperature of 220 degrees Fahrenheit and a bi-metallic control or limit switch 52 set for a maximum of 240 degrees Fahrenheit. These switches control the temperatures of the heating element and causes it to come on when the temperature falls below 220 degrees Fahrenheit and cut off at above 240 degrees Fahrenheit. Of course, the temperatures can be set at different ranges depending on the use of the system. Also note that the heating demands causes switch 50 to close contacts at 190 degrees Fahrenheit and the bi-metallic control switch 52 opens the contacts at 220 degrees Fahrenheit.

Figure 4:
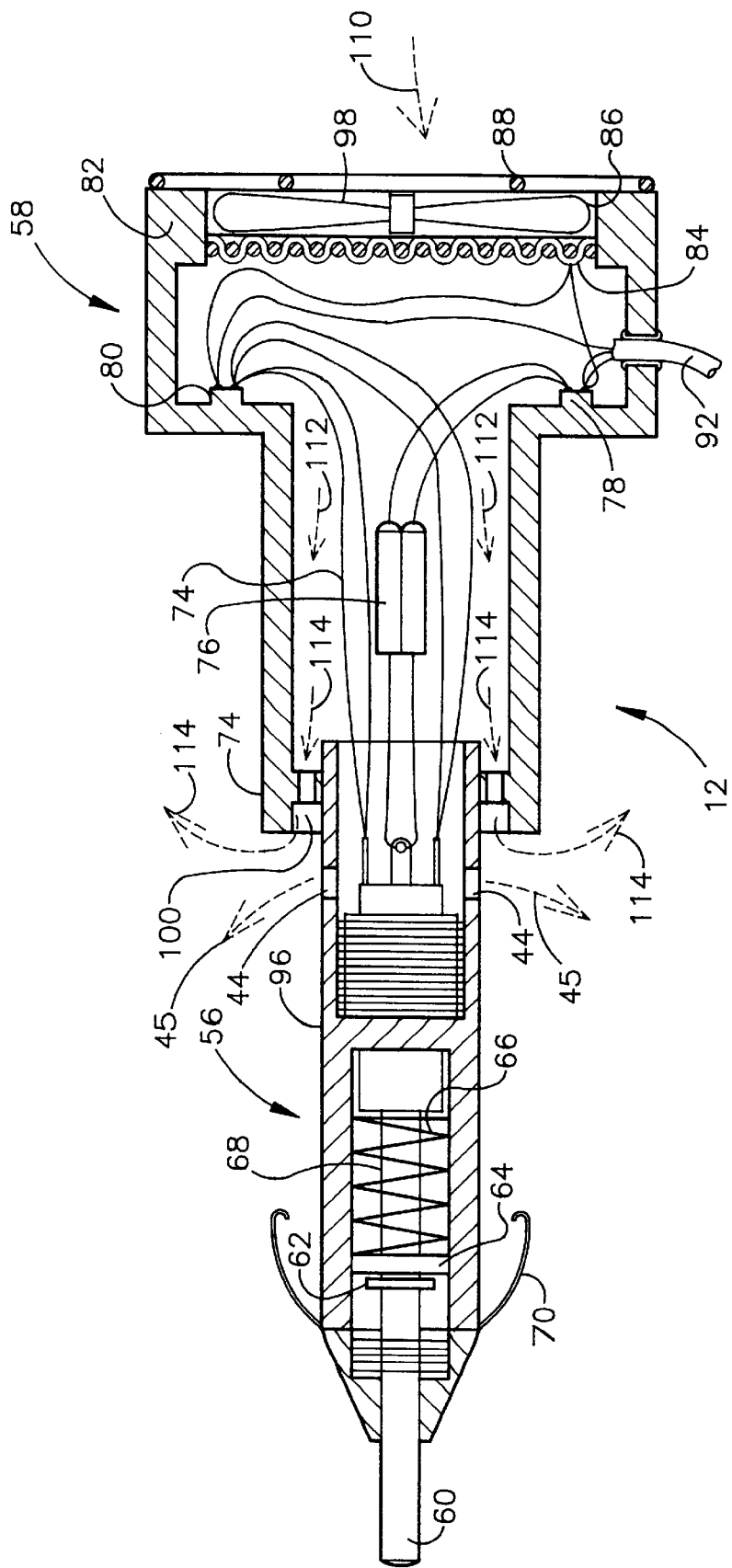
FIG. 4 is a schematic cross-section of the electrical plug.

With reference to FIG. 4, there is shown a schematic cross-section of the electrical plug 12. There is a plug end 56 and a fan end 58. The plug end is inserted into a standard vehicular 12 volt direct current electrical outlet. A pancake cooling fan 98 is mounted at the fan end of the plug. The preferred cooling fan is manufacture by Mechatronics Company at 8152304 Avenue S.E. Post Office Box 613, Preston, Wash., 98050. It is sold as a 60 mm brushless DC fan which produces 28 cubic feet of air per minute. The cooling fan 98 pushes air from the fan end to the plug end where part of it escapes through passageways 100; as better seen through FIG. 5, and penetrates into the electrical outlet past the ground clips 70 for the cigarette lighter plug and past the solid copper connector tip 60. This permits the high amperage current flow. Preferably the solid copper rod 60 is ⅛ inch diameter solid copper to reduce the heat at the contact point where it contacts the electrical outlet. Air is directed around this area to keep the whole end of the plug end 56 cool as well as the electrical outlet in which it is connected so that the temperature does not rise to an unacceptable degree. Additional passageways such as cross-passageway and outlet 44 that assist in the cooling are provided by any escape through the opening which contains the solid copper rod 60 and through holes 44 at the outlet which are mounted in the side of the fan housing neck. These holes are preferably ¼ inch in diameter to permit greater air flow and further assist in keeping the electrical conductor cool.

The solid copper rod 60 has an F-clip 62 around the rod to give spring pressure on the contact point. There is a washer 64 to keep the contact rod in position and to keep the spring from making contact with the rod. Spring 66 provides the tip contact pressure. Heat shrink tubing cover 68 is on the outside of the rod 60 to keep the rod from coming into contact with the spring 66. Ground clips 70 are provided to make contact between the cigarette lighter plug and the electrical outlet. Two wires 72 are provided for a ground from each contact to allow for cooling when a high current draw is used. Attachment 74 connects the plug end to the fan end with four struts (not shown in FIG. 4).

Two thermal sensors 76 each rated at 10 amps are in parallel so as to manage a 20 amp current draw. A single 20 amp thermal sensor may be substituted for the two to provide the same purpose. Dual-row terminal strips 78 for the positive side current flow wire junction and dual-row terminal strips 80 for the negative side current flow for the wire junction are provided. Mounting block 82 holds the cooling fan. Screen wire 84 is provided over the front of the fan to protect the wires from contact with the fan blades. The fan housing 86 surrounds the fan. Fan guard 88 is provided at the inlet of the fan. A size 14 gauge 3-wire electrical wire 92 is used to conduct the electricity from the battery source to the electrical heater or other application and is part of the cable 14.

The fan mounting housing and air flow casing for plug end 56 allows air flow to be channeled for maximum cooling effect for the male plug and female outlet. The ¼ inch holes 44 on the side of fan housing neck 96 allows additional air flow to keep the electrical conductors cool.

With reference to FIG. 5, there is shown a schematic version of attachment 78 from the plug to the fan housing. There are 4 struts 102 that provide 4 passageways 100 as best seen in the figure. The air flows from the cooling fan through the 4 annular arcuate passageways 100 direct the outlet air parallel to the longitudinal axis on the exterior of the plug end into the electrical outlet to cool the tip at the plug end 56 as well as the cooling the surrounding outlet to maintain the temperature at an acceptable level. This is augmented by the cross-passageway air 45 exiting from cross-passageway 44.

Figure 6:
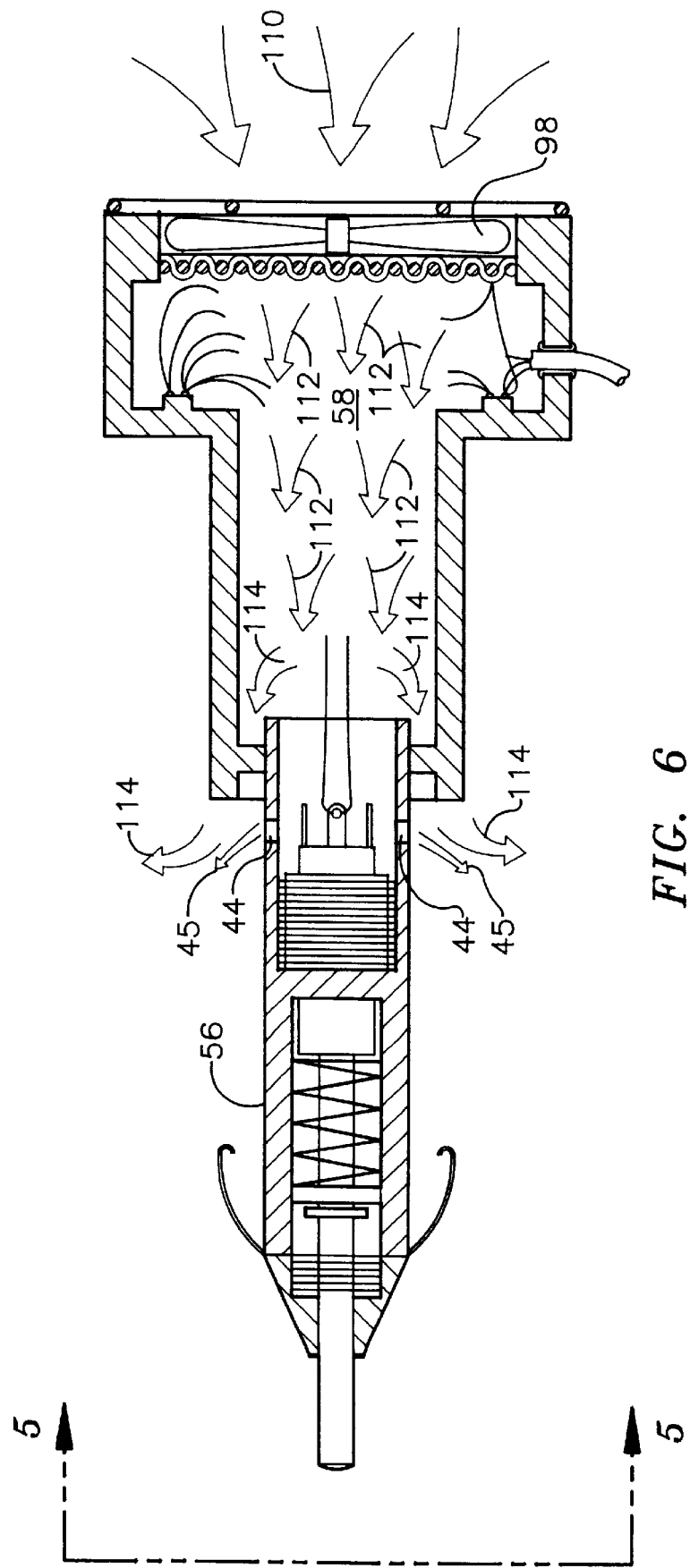
FIG. 6 is a cross sectional side view of the electrical plug showing air movement.
Figure 8:
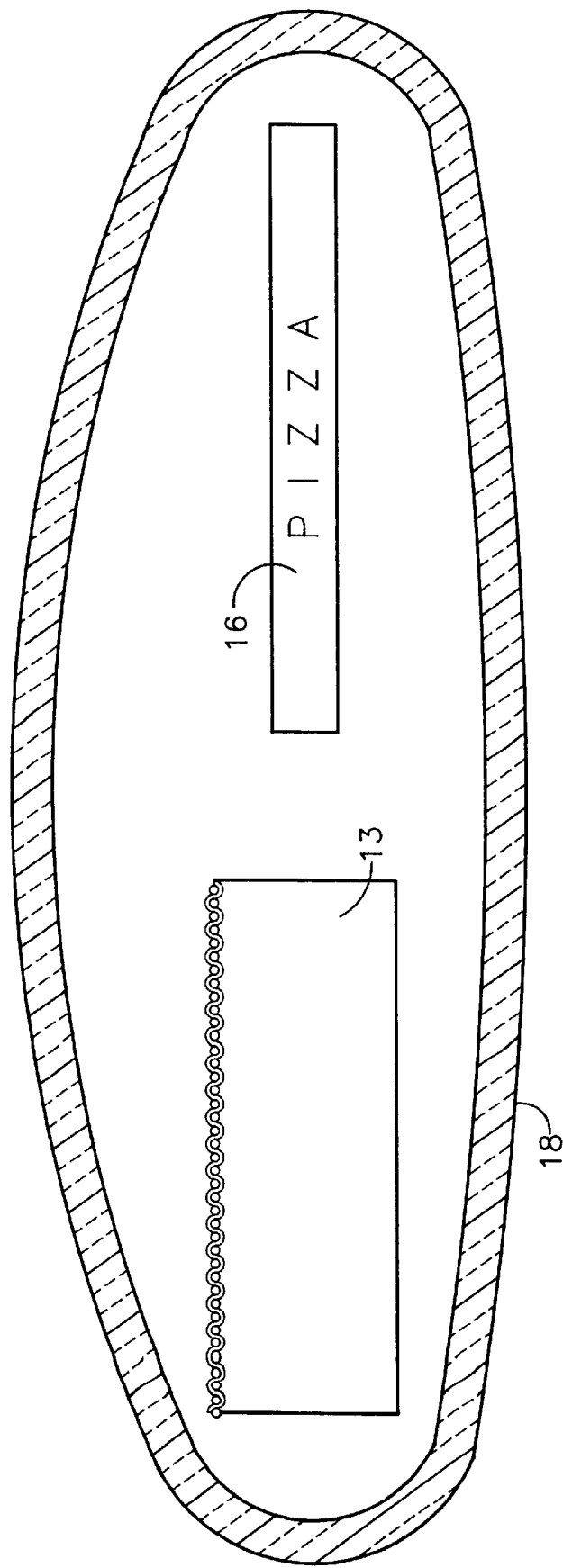
FIG. 8 is a cross-sectional figure depicting the insulative enclosure with heater 13 and pizza box 16 situated therein.

With reference to FIG. 6, there is shown a cross sectional side view of the electrical plug showing air movement. Outside air 110 is drawn into the electrical plug by cooling fan 98 which is forced into the fan end 58 as shown by airflow 112. Much of the cooling air exits through the longitudinally extending passageways 100 which parallel the outside of the plug end 56 and inside the electrical outlet (not shown) so that cooling air is forced into the plug and outlet to cool the materials and keep them from overheating. Some of the cooling air 112 is forced into the inside of the plug end to cool the interior of the plug where the air then exits, as shown at 45, through cross-passageways 44.

With reference to FIG. 7, there is shown a schematic of the connector 20 which includes a male member or connection 108 and a female member or connection 122. The female member is connected by 3 wires; one of which is a ground wire 104 and two positive wires 106. The two positive wires are utilized to share the current flow and increase greater flexibility but a single wire could accomplish the same result. Male connector 108 is connected to 3 power cords, which are preferably 14 gauge wire, and attached to the electrical plug 12 (not shown). Also shown are spring clips 120 to hold the assembly of two connectors together when the male plug or connector 108 is plugged into the female connector 122. A rivet 124 is utilized to hold the two halfs of the male plug together. There are lights 116 which light up as red to show that the heater element is drawing current and light up as green to show that the fan in the electrical plug is functioning.

There is shown in the present disclosure a fan cooled self-contained electrical plug for use in a pre-existing vehicular outlet which has many applications other than just for a heater. Also there is shown in the disclosure a special fan-cooled heater that may be used for keeping pizza hot while being delivered to a customer but such can also be used for other heating and cooling purposes.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A plug for a pre-existing direct current outlet for a vehicle comprising:
   a male electrical plug for plugging into a pre-existing vehicular direct current outlet;
   a plug end for said male electrical plug;
   a connector at a first end of said plug for completing a ground and voltage connection within said outlet;
   an electrical fan within said plug for cooling said connector by blowing air into said plug end;
   a passageway for transferring the cooling air from said electrical fan into said plug end; and
   an electrical connection on said plug for electrical connection to an external electrical device.

2. The plug of claim 1 wherein said plug further includes:
   a solid copper rod main contact;
   a spring bias for said main contact;
   said electric fan being a pancake fan mounted coaxially at outer end of said plug;
   annular arcuate outlets for directing said cooling air parallel to said plug;
   a cross-passageway for cooling air adjacent to said main contact; and
   a thermal fuse.

3. A pizza box heater for use with a pre-existing vehicular supplied DC electrical outlet comprising:
   a container;
   an electric heater within said container;
   an electric fan within said container for blowing air past said electric heater;
   a passageway for air to an inlet for said electric fan;
   a passageway for air to an outlet from said electric fan to said electric heater;
   an outlet passageway from said container to a food compartment for directing heating air into said compartment;
   a spacer disposed on said container to prevent the blocking of said outlet passageway from said heater;
   an insulating enclosure for said container with sufficient space to accommodate a pizza box;
   an electrical plug for a pre-existing vehicular direct current outlet for a vehicle including a male electrical plug;
   a plug end for said male electrical plug;
   a connector at a first end of said plug for completing a ground and voltage connection within said outlet;
   an electrical fan within said plug for cooling said connector by blowing air into said plug end;
   a passageway for transferring the cooling air from said electrical fan into said plug end; and
   a cable connecting said container to said electrical plug.

* * * * *